No. 834,068. PATENTED OCT. 23, 1906.
C. E. McCAFFREY.
LUBRICATOR.
APPLICATION FILED JAN. 25, 1906.
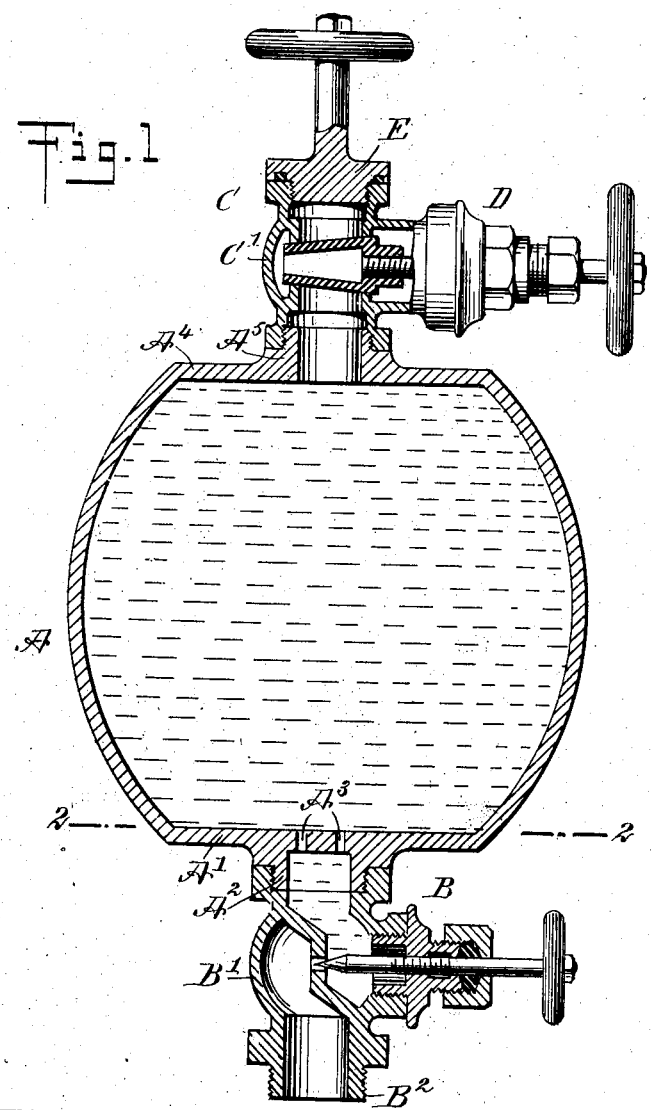
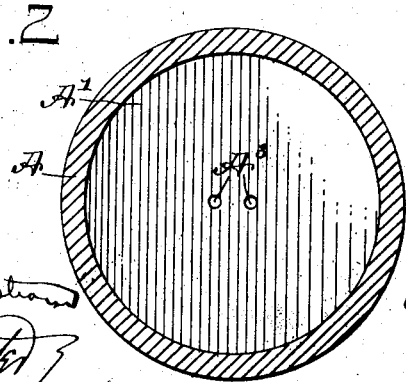
WITNESSES:
INVENTOR
Charles E. McCaffrey
BY
Munn & Co
ATTORNEYS

UNITED STATES PATENT OFFICE.

CHARLES E. McCAFFREY, OF WINSTED, CONNECTICUT.

LUBRICATOR.

No. 834,068.　　　　　　　Specification of Letters Patent.　　　　　Patented Oct. 23, 1906.

Application filed January 25, 1906. Serial No. 297,768.

*To all whom it may concern:*

Be it known that I, CHARLES E. McCAFFREY, a citizen of the United States, and a resident of Winsted, in the county of Litchfield and State of Connecticut, have invented a new and Improved Lubricator, of which the following is a full, clear, and exact description.

The object of the invention is to provide a new and improved lubricator, more especially designed for use on the steam-cylinders of rock-drills and other steam-actuated machines and arranged to prevent leakage and waste of the lubricant, to insure regular feed of the lubricant in predetermined quantities, and to allow of readily refilling with lubricant without stopping the machine to which the lubricator is applied.

The invention consists of novel features and parts and combinations of the same, which will be more fully described hereinafter and then pointed out in the claims.

A practical embodiment of the invention is represented in the accompanying drawings, forming a part of this specification, in which similar characters of reference indicate corresponding parts in both the views.

Figure 1 is a sectional side elevation of the improvement; and Fig. 2 is a sectional plan view of the same on the line 2 2 of Fig. 1.

The reservoir A for containing the lubricant is provided on its bottom A' with a threaded offset $A^2$, on which screws the casing B' of a needle-valve B, having its outlet end $B^2$ threaded for convenient connection with the steam-cylinder of the rock-drill or other steam-actuated machine on which the lubricator is to be used. In the bottom A' of the reservoir A are formed oil-apertures $A^3$, through which the lubricant in the reservoir A flows to the offset $A^2$ and the needle-valve B for the latter to feed the lubricant in minute quantities by way of the outlet $B^2$ to the steam-cylinder on which the lubricator is to be used.

The top $A^4$ of the reservoir A is provided with a threaded offset $A^5$, on which screws the casing C' of a filling and closing device C, provided with a globe or gate valve D under the control of the operator and also with a screw-plug E, likewise under the control of the operator, for closing the top of the casing C'.

When the lubricator is attached to the steam-cylinder of a rock-drill, for instance, and steam is admitted to the said cylinder and the needle-valve B is opened, then steam passes by way of the needle-valve B and the apertures $A^3$ into the reservoir A and through the lubricant contained therein to exert a pressure on the lubricant, and thereby cause the latter to flow through the apertures $A^3$ and the needle-valve B to the steam-cylinder and the part to be lubricated. The amount of lubricant passing from the reservoir A to the part to be lubricated is regulated by the needle-valve B.

When the rock-drill is stopped, the steam-pressure in the reservoir A ceases and further outflow of lubricant now ceases even if the needle-valve B is left open, as the minute apertures $A^3$ and the minute opening in the needle-valve B hinder the outflow of the thick lubricant. In case one of the apertures $A^3$ should become clogged while the rock-drill is at a standstill then the other aperture $A^3$ permits entrance of steam to the reservoir A as soon as the rock-drill is again started, and the steam-pressure now again exerted on the lubricant causes the latter to forcibly clear the clogged-up aperture, thus keeping the lubricator in proper working condition.

As the lubricant contained in the reservoir A is under steam-pressure and the top of the reservoir A is closed by both the valve D and the plug E, it is evident that the steam is not liable to force the oil out of the reservoir A by way of the filling and closing device C, as is so frequently the case in lubricators as heretofore constructed.

It is understood that by having both the valve D and the plug E a double closing device is provided for preventing any escape and waste of oil by way of the said device.

When it is desired to refill the reservoir A with lubricant, it is only necessary for the operator to temporarily close the needle-valve B, then to open the normally closed valve D and to unscrew the plug E, so as to allow of passing lubricant through the casing C' into the reservoir A. When the latter has been refilled, then the valve D is again closed and the plug E is replaced, after which the needle-valve B is opened the desired distance to again allow the lubricant to feed in proper quantities to the cylinder of the machine on which the lubricator is applied.

Having thus described my invention, I claim as new and desire to secure by Letters Patent—

1. A lubricator for steam rock-drills and other steam-actuated machines, comprising a reservoir for containing the lubricant, a needle-valve casing attached to the bottom of the said reservoir and connected with the interior thereof by small apertures in the bottom of the reservoir, the discharge end of the casing being arranged for connection with the part to be lubricated, and a filling and closing device for the top of the reservoir.

2. A lubricator for steam rock-drills and other steam-actuated machines, comprising a reservoir for containing the lubricant, a needle-valve casing attached to the bottom of the said reservoir and connected with the interior thereof by small apertures in the bottom of the reservoir, the discharge end of the casing being arranged for connection with the part to be lubricated, and a filling and closing device for the top of the reservoir, provided with a manually-controlled valve and a manually-controlled filling-plug.

In testimony whereof I have signed my name to this specification in the presence of two subscribing witnesses.

CHARLES E. McCAFFREY.

Witnesses:
 RICHARD T. HIGGINS,
 MAY T. DOOLEY.